United States Patent [19]

Janes

[11] 3,939,354
[45] Feb. 17, 1976

[54] METHOD AND APPARATUS FOR SEPARATION OF IONS FROM A PLASMA

[75] Inventor: George Sargent Janes, Lincoln, Mass.

[73] Assignee: Jersey Nuclear-Avco Isotopes, Inc., Bellevue, Wash.

[22] Filed: Feb. 2, 1973

[21] Appl. No.: 328,954

[52] U.S. Cl.............................. 250/484; 250/499
[51] Int. Cl.²..................... B01D 59/44; H01J 39/34
[58] Field of Search......... 204/155 R; 250/298, 284, 250/489, 499

[56] References Cited
UNITED STATES PATENTS

| | | |
|---|---|---|
| 2,868,991 | 1/1959 | Josephson et al.................. 250/499 |
| 3,004,158 | 10/1961 | Steimel............................... 250/284 |
| 3,443,087 | 5/1969 | Robieux et al...................... 250/284 |
| 3,772,519 | 11/1973 | Levy et al........................... 250/284 |

Primary Examiner—Harold A. Dixon
Attorney, Agent, or Firm—Weingarten, Maxham & Schurgin

[57] ABSTRACT

In a system for isotope separation, method and apparatus empolying crossed-field MHD particle accelerating techniques for collecting ions of a desired isotope after selective ionization of that isotope. In the plasma of electrons and selectively ionized atoms which results from selective isotope ionization, the ions are collected by inducing a circulation of the plasma electrons to provide a $\vec{J}\times\vec{B}$ relationship for MHD acceleration of the ions. The electron circulation enhances penetration of the plasma by the accelerating electric field and avoids the generation of large Hall voltages within the system as well as reducing the required magnitude of electrode currents.

26 Claims, 4 Drawing Figures

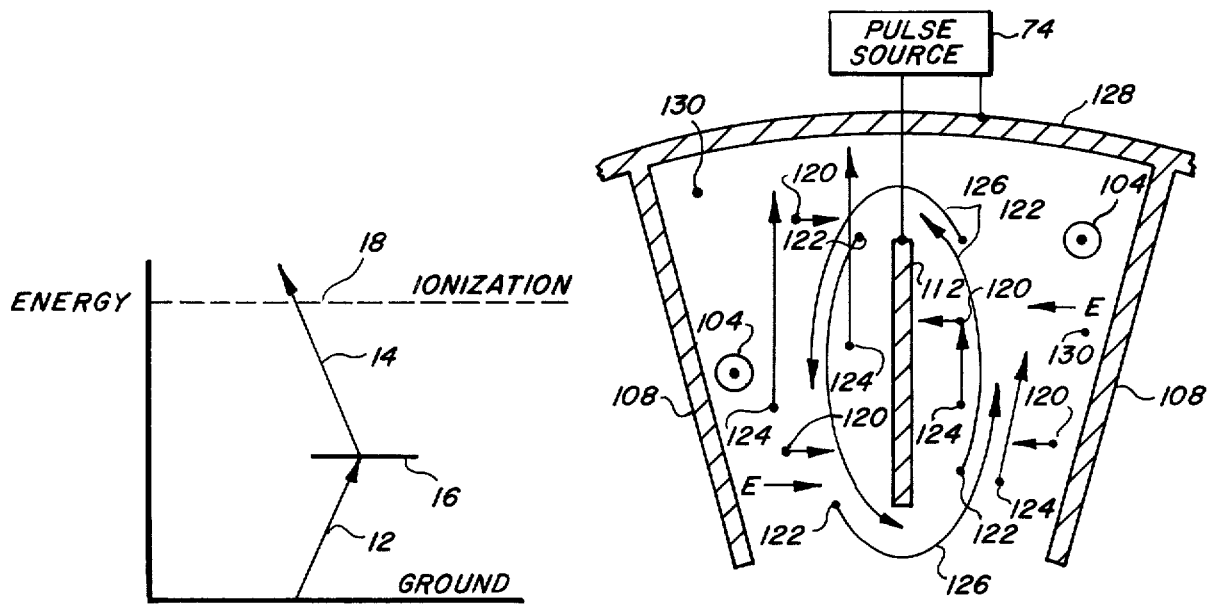
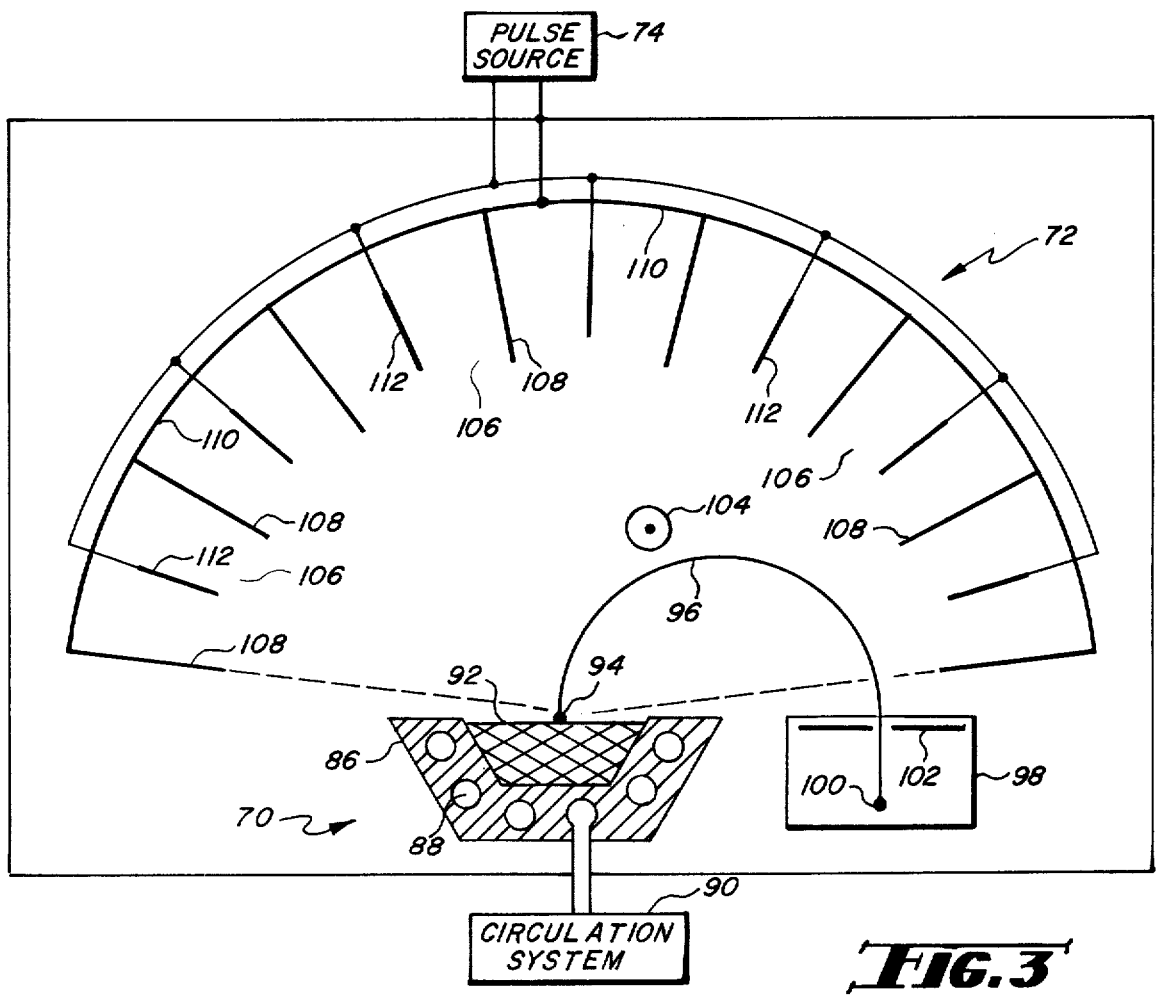

METHOD AND APPARATUS FOR SEPARATION OF IONS FROM A PLASMA

FIELD OF THE INVENTION

This invention relates to method and apparatus for the separation of particles in a plasma and in particular to the collection of selectively ionized isotopes for isotope enrichment.

BACKGROUND OF THE INVENTION

Nearly all fission reactions utilizing the uranium isotope, $U_{235}$, require a concentration of the $U_{235}$ isotope greater than in the naturally occurring state. The process of enrichment whereby the concentration of $U_{235}$ in natural or depleted uranium is raised to a desired level has been achieved in the past by many techniques which generally operate to separate $U_{235}$ from the other uranium isotopes, chiefly $U_{238}$, on the basis of its slight chemical or mass difference. Enrichment according to these techniques often requires cascaded processing using a sequence of repeated applications of the same steps, each step providing a slight increase in the concentration of the desired $U_{235}$ isotope.

A promising new technique for efficient isotope enrichment operates by exposing a vapor of uranium to pulsed laser radiation to produce a plasma of selectively ionized $U_{235}$ atoms and to permit separation of $U_{235}$ ions based on their electrical charge. Typically, separation of the ions resulting from selective ionization is achieved by accelerating them out of the vapor toward a collecting surface through pulsed application of crossed-field MHD acceleration forces to the plasma just after its creation with each pulse of laser radiation. In using this process, it has been noted that the plasma, a conducting medium, has associated with it a skin depth effect which impedes the penetration and correspondingly the effectiveness of the electrical field component of the crossed-field MHD acceleration force. Additionally, the electrons in the plasma being of much lower mass and more easily accelerated, will contribute a substantial electron current distinct from the ion current of desired $U_{235}$ atoms. The large electron current may result in electrode degradation and will lead to the generation of substantial Hall voltages which permitted to short circuit will impair the enrichment process efficiency.

BRIEF DESCRIPTION OF THE INVENTION

In accordance with a preferred embodiment of the present invention, an efficient crossed-field MHD acceleration system is disclosed for separating ions from a plasma with reduced effect from the usual impairing factors associated with the plasma. In implementing this system a plurality of ion separation chambers are provided to receive a radially expanding flow of uranium vapor which is selectively ionized to create a plasma within each chamber. The chambers are operative to apply to the plasma orthogonal electric and magnetic fields to impart a motion to the ions which drives them to separate collecting surfaces out of the expanding flow. The fields are applied in a configuration which reduces skin effect problems, provides a high driving point impedance for the electric field with a consequent reduction in current and avoids the generation of extraneous Hall voltage problems.

In accordance with a specific preferred embodiment of the invention for uranium enrichment each chamber typically comprises a planar first electrode placed plane parallel to the plasma flow. A second electrode in an extruded U shape surrounds the first electrode on three sides with the open side facing the expanding flow. A plurality of chambers are placed side-by-side in an arc surrounding the vapor flow, and a beam of laser energy is directed between the electrodes in each chamber to ionize the $U_{235}$ uranium isotope in the vapor. An axial or lengthwise magnetic field is applied to the region between the electrodes and an electric field is periodically applied between the first and second electrodes for a brief interval. Under the influence of the momentary electric field and steady D.C. magnetic field, the electrons are accelerated to assume a trajectory circulating about the first electrode while the ions, having a mass many orders of magnitude greater than that of the electron, are accelerated toward one of the electrodes where they are collected. The radius of gyration for the uranium ion in the magnetic field is very much larger than the radius of gyration for the electron and its trajectory appears almost as a straight line while the path of the electrons can be made to close upon itself within the chamber.

Because the electrons are induced to orbit rather than complete an electric circuit between the electrodes, the driving point impedance for the two electrodes is substantially increased which not only reduces the current that is supplied to the electrodes, but also increases the skin depth of the plasma to improve the penetration of the pulsed electric field between the electrodes. Because the electrons are circulating on closed paths within each chamber, Hall voltages associated with the electron current in the magnetic field alternate in direction between each electrode and do not accumulate to a large potential which could impair the operation of the enrichment process.

The unaccelerated particles in the vapor flow continue on a trajectory towards a separate collection plate where they may be periodically removed.

BRIEF DESCRIPTION OF THE DRAWINGS

These and other features of the present invention will be more fully understood by reference to the detailed description of a preferred embodiment presented below for purposes of illustration, and not by way of limitation, and to the accompanying drawings of which:

FIG. 1 is an energy level diagram useful in explaining the functioning of the enrichment system with which the method and apparatus of the invention is associated;

FIG. 3 is a sectional view of a portion of the apparatus of FIG. 2, illustrating details of the ion separation chambers according to the present invention and FIG. 4 is an expanded view of one chamber in the diagram of FIG. 3 showing details useful in explaining the operation of the invention.

DETAILED DESCRIPTION OF THE PREFERRED EMBODIMENT

Figure 2:
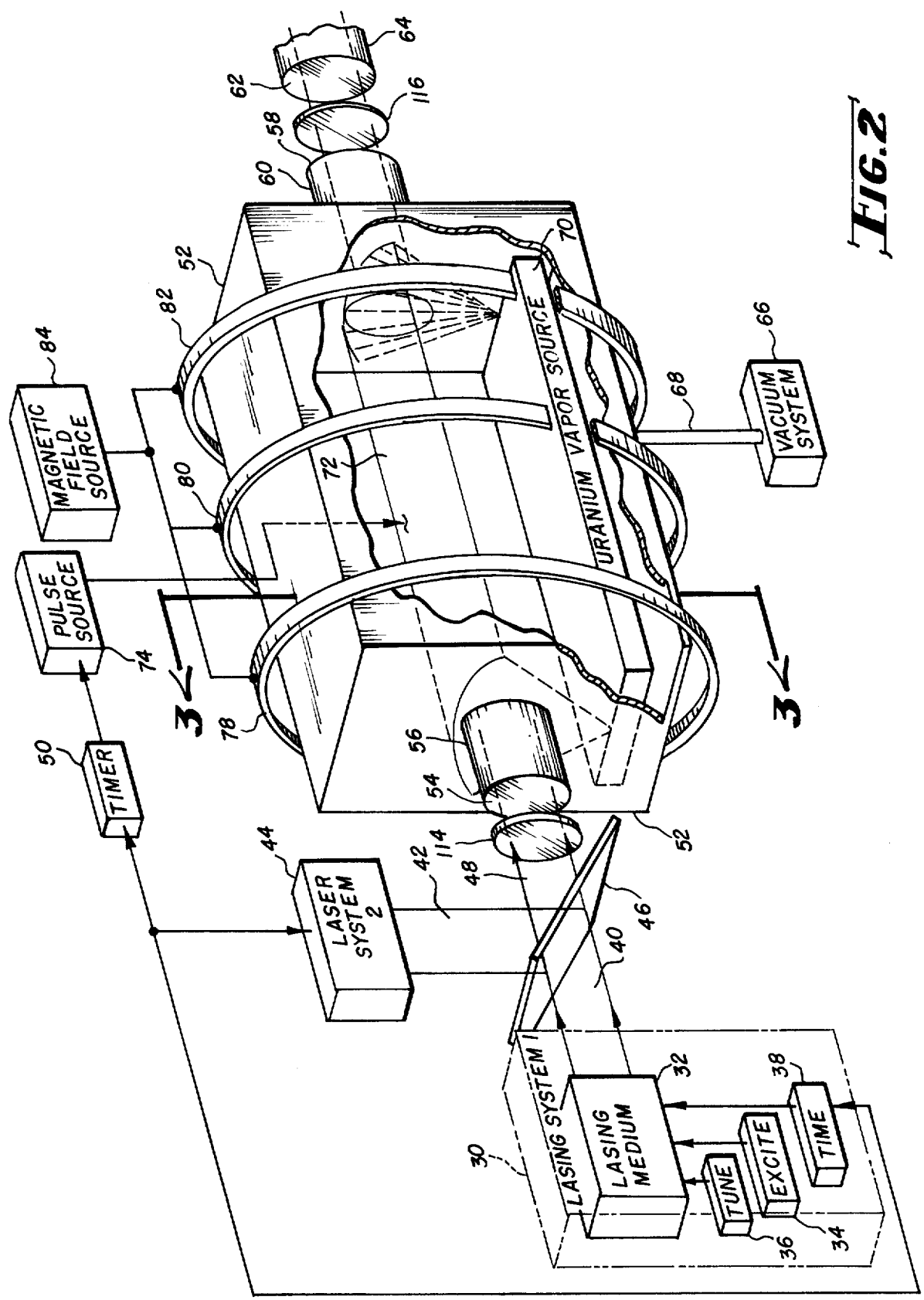
FIG. 2 is a diagram of enrichment apparatus for use in the invention.

The present invention contemplates a technique for separating charged particles of elemental, molecular or other type from a generally neutral environment having particles of at least both charge polarities with different mass-charge ratios. The technique contemplates establishing significantly different trajectories for the particles of each charge polarity.

The present invention may best be understood by reference to the enrichment system with which it is preferably associated in order to separate and collect the $U_{235}$ isotope of uranium from the other constituents of the naturally occurring or depleted element. In accomplishing this enrichment, a vapor of uranium is generated and passed through a periodically applied radiant energy in a beam of laser radiation having one or more frequencies of radiation to produce selective ionization of the desired $U_{235}$ isotope. Typical energy steps are illustrated in FIG. 1 for selective ionization of the $U_{235}$ isotope by employing two energy steps 12 and 14 which respectively produce selective excitation of $U_{235}$ atoms to an intermediate energy level 16 and subsequent ionization of the excited atoms from the level 16 to above the ionization energy level 18.

As a result of the technique briefly illustrated by reference to FIG. 1, there will result a plasma containing, in addition to neutral atoms, a plurality of electrons and corresponding ions of which a larger proportion are of the $U_{235}$ isotope by comparison to the proportion in the neutral state. The charge carried by the ionized $U_{235}$ atoms provides them with a unique characteristic whereby they may be separated from the remainder of the plasma. In understanding the method and apparatus for accomplishing this separation, it will be beneficial to describe the overall enrichment system with which it is associated. A prior enrichment system of this type is shown in French Pat. No. 71.14007 granted Jan. 10, 1972 (Publication No. 2.094.967), incorporated herein by reference. A similar system modified in accordance with this invention is shown in FIG. 2.

In FIG. 2 a laser system 30 includes a lasing medium 32 which may typically be a solution of a lasing dye. Lasing medium 32 is pumped or excited to a lasing condition by an excitation source 34 which may typically be a flash lamp or another laser. The frequency of radiation from the lasing medium 32 is controlled by a tuning system 36 and a timing system 38 initiates each pulse of an output beam 40. One or more stages of amplification may be used to intensify beam 40 as desired. The lasing system 30 may comprise a "Dial-A-Line" laser of the Avco Everett Research Laboratory, Everett, Mass., as generally disclosed in U.S. Pat. No. 3,684,979. The duration of the beam 40 is determined by properties of the laser system and lasing medium as is well known in the art. Typical laser pulse duration is a substantial fraction of a microsecond.

The beam 40 is combined with a beam 42 from a second laser system 44. A dichroic mirror 46 operates in a conventional mode to combine the beams 40 and 42 into a composite beam 48.

The timing system 38 in the laser system 30 and corresponding timing system in the laser system 44 are operated in unison by a timer 50 which also provides other activation signals in the system as will be described below.

The beam 48 enters a chamber 52 through a window 54 which may be of quartz crystal and which extends beyond chamber 52 on a pipe 56 to reduce contamination from vapor within chamber 52. Beam 48 traverses the length of the chamber 52 exciting through a similar window 58 and pipe 60 for subsequent use in one or more additional chambers through a window 62 on a pipe 64 to provide as complete utilization of the energy in the beam 48 as is possible. The chamber 52 is maintained at a low pressure through a vacuum system 66 and conduit 68 to prevent interference with the process of selective ionization and collection in chamber 52 from chemical reaction or particle collision with extraneous elements.

Within chamber 52 a uranium vapor source 70 is operative to provide a radially expanding uranium vapor flow. The vapor expands into a uranium ion collector 72 where it is periodically irradiated with the laser beam 48 from the respective laser sources to produce selective ionization of the desired $U_{235}$ isotope in the vapor. Subsequent to ionization, the timer 50 activates a voltage pulse source 74 to produce within ion separator 72 a short duration electric field. Respective magnetic field coils 78, 80 and 82 are energized by a magnetic field source 84 to provide a D.C. magnetic field parallel to the beam of laser radiation 48 throughout the ion collector 72 for interaction with the electric field pulse according to crossed-field MHD accelerator principles.

In FIG. 3, internal structure of the chamber 52 is more clearly shown. The vapor source 70 is indicated as including a crucible 86 having cooling ducts 88 through the walls thereof to communicate with a cooling and circulating system 90 to prevent excessive temperature in the crucible 86. The crucible contains a mass of uranium metal 92 in a trough running substantially the length of the chamber 52 parallel to the beam 48.

A line 94 lengthwise along the surface of the uranium mass 92 is irradiated with a beam 96 of electrons from a beam source 98 which typically comprises a long, heated filament 100 as electron source and collimating accelerator plates 102. The beam is focused toward line 94 by magnetic field 104 from coils 78, 80 and 82. The intensity of the beam 96 is adjusted to provide local heating of the line 94 such that the uranium is vaporized in the region of the line to produce a radial expansion of uranium vapor directed away from the line toward the uranium ion collector 72 over a wide angle. The expanding uranium vapor establishes in general a locally unique particle direction. At least a portion of the uranium mass 92 will typically be maintained in the liquid state by heat from beam 96 and thus replenish the vaporized uranium.

The ion collector 72 is shown to comprise a plurality of separation chambers 106 arranged in an arc about the line 94 to receive the expanding vapor flow. A plurality of electrodes 108 emanate toward line 94 from a cylindrical arc 110 to define each chamber 106. These electrodes 108 are in the local plane of the vapor flow and extend into the page of FIG. 3 along with the arc 110. A further set of electrodes 112 are placed between each electrode 108 running parallel to the local flow direction and extending substantially the length of the chamber 52 with electrodes 108. The electrodes 112 are placed to permit circulation of electron current around the electrodes 112 in each chamber 106. Electrodes 108 and 112 are typically supported at their ends. The electrodes 108 are connected in common to one output line of the pulse source 74 to receive a voltage pulse, typically in the range of 30 to 100 volts, while the electrodes 112 are tied in common and connected to the other output line of pulse source 74. The source 74 is activated by the timer system 50 for a short duration typically on the order of 2 microseconds or less as will be described below.

To provide illumination of each chamber 106 the laser beam 48 is directed by mirror systems 114 and 116 shown in FIG. 2 such that the beam proceeds, by way of multiple reflections, through each chamber 106 of the ion collector 76. Alternatively, a plurality of laser systems may be utilized to provide a separate beam 48 for each chamber 106.

By reference now to FIG. 4, the details of operation of the ion collector 76 may be most clearly understood from a single one of the chambers 106 with the central electrode 112 surrounded by the side electrodes 108. After the laser beam is applied to the area between electrodes 108, there will exist a substantial number of ions 120 which will include the $U_{235}$ isotope of uranium in a substantially higher proportion than in the neutral state. There will also be a corresponding number of electrons 122 produced from the ionization process. Many neutral atoms 124 will also exist in the region between the electrodes 108 and surrounding the electrode 112. The entire environment in that region can be considered a plasma.

Directly subsequent to the ionization produced by simultaneous application of the laser beams by the timer 50, the pulse source 74 connects a voltage between the electrodes 108 and 112 for a brief interval. The magnetic field 104 is produced in the region between the electrodes 108 continuously so that the application of voltage between the electrodes 108 and 112 will cause a brief acceleration of the electrons 122 toward the positive electrode 108. The electrons will, however, be deflected by the magnetic field 104 and ultimately constrained to follow an orbit 126 about the electrode 112 on equipotential lines between the electrodes 108 and 112. The application of the voltage between the electrodes 108 and 112 also induces motion of the ions 120 toward the negative electrode 112. The strength of the magnetic field 104, typically 200 gauss, and the electric field between the electrodes 104 and 108 is selected such that the resulting radius of gyration for the electrons 122 is relatively small and orbital circulation of the electrons about the electrode 112 may be achieved, but such that the radius of gyration of the ions 120, due to their substantially greater mass, or greater mass to charge ratio is very large and the trajectory for the ions 120 will be substantially a straight line toward the collection electrode 112. Similar operation may be achieved by reversing the polarities of the crossed-field. The size of chamber 106 preferably minimizes ion 120 collisions with other particles.

The duration for the electric field between the electrodes 108 and 112 is typically selected to be less than a charge exchange time for an ion 120 and a neutral atom 124. The resulting ionization of a previously neutral atom 124 from the charge exchange reaction will thus occur subsequent to the application of the electric field and the undesired atom 124 will not be attracted toward the collection electrode 112 but will continue in the direction of radial expansion of the uranium vapor toward a rear plate 128 on the arc 110.

It can now be appreciated that the induced circulation of the electrons 122 in orbits 126 about the electrode 112 substantially inhibits their flow in the circuit of the electrodes 108 and 112 and source 74 so that a relatively high potential can be maintained across the electrodes without a substantially high current flow. This relationship creates a high driving point impedance for the source 74. The high impedance and relatively low current flow also helps to retard electrode degradation from particle exchange at the electrode surfaces. This high impedance further reduces or eliminates skin depth difficulties which would retard penetration of the electric field between the electrodes 108 and 112 particularly in view of the relatively short duration of the electric field.

It can also be appreciated that the structure indicated in FIG. 5 provides in the electron orbits 126 a current density $j$ to satisfy $\vec{J} \times \vec{B}$ relationship which gives an alternative description of the forces which separate the charged ions. Since the circulation of electrons in orbits 126 provides an opposite current flow on each side of the electrode 112, the Hall voltages associated with the $\vec{J} \times \vec{B}$ relationship are in opposing directions between the electrodes 108 such that despite the provision of many electrodes 108 and 112 in the alternating sequence shown in FIG. 3 there is no cumulative generation of a large Hall voltage over the stack of electrodes. Such Hall voltages could distort the current flow pattern and cause voltage arcing problems.

Various additional considerations may enter into the fabrication of the above indicated structure. In particular it may be desirable to include a return path for the magnetic field 104 outside of the coils 78, 80 and 82 by providing high permeability discs on the end of chamber 52 and bars of similar characteristics connecting the discs outside of the coils. The material for the chamber 52 vapor source 70, and ion collector 72 are also preferable, of a material which will not substantially affect the magnetic field 104. It may also be desired to provide collection plates for the ions and neutral particles distinct from the electrodes. A source of electrons such as filament 130 in FIG. 4 may be provided to offset the slight flow of electrons in the circuit of the pulsed electric field or the molten uranium 92 may be used as such a source.

Having described above a preferred embodiment for the present invention, it will occur to those skilled in the art that further alternatives and modifications to the disclosed system can be devised within the spirit of the invention. Accordingly, it is intended to limit the scope of the invention only as indicated in the following claims.

What is claimed is:

1. A method for separating particles of a first charge type from a neutral, bounded environment containing at least particles having a second charge type and wherein said particles of said first and second charge type have different mass-to-charge ratios, said method including the steps of:
   circulating the second charge type particles in said environment on paths which generally close within the bounded environment; and
   accelerating said particles of said first charge type toward a collection surface in a direction distinct from the circulation of said second charge type particles.

2. The method of claim 1 wherein said circulating and accelerating steps further include the steps of:
   establishing a magnetic field in said environment; and
   applying an electric potential between first and second electrodes to attract said particles of said first charge type toward one of said electrodes and to circulate said second charge type particles around one of said electrodes.

3. The method of claim 1 further including the step of producing osotopically selective ionization of uranium vapor to achieve said environment.

4. The method of claim 1 wherein said particles of said first charge type include ions and said particles of said second charge type include electrons.

5. In a system for isotope enrichment a method for separating ions in a bounded plasma environment of selectively ionized particles, said method comprising the steps of:

applying a magnetic field to said environment; and applying an electric field to said environment in a configuration to produce circulation of the plasma electrons on paths which generally close within the bounded environment and to accelerate said ions in a predetermined direction.

6. The method of claim 5 further including the step of providing means for collecting the ions accelerated in said predetermined direction.

7. The method of claim 5 further including the step of providing a vapor flow having selective ionization of one isotope to define ions in said environment.

8. The method of claim 7 wherein said one isotope is the $U_{235}$ isotope of uranium.

9. The method of claim 5 further including the step of replenishing electrons in said environment apart from ions released by ionization.

10. The method of claim 5 including the step of applying said electric field in a pulse which terminates before said ions undergo substantial charge exchange reactions thereby to inhibit acceleration of charged particles resulting from charge exchange reactions.

11. The method of claim 5 further including the steps of:

providing a radially expanding vapor having selective ionization of said particles to define said plasma environment; and establishing a plurality of chambers oriented around the vapor expansion and defining the bounds of the environment to receive said vapor expansion between a central and plural peripheral electrodes in each of said chambers;

said electric field applying step including applying a voltage between said central and peripheral electrodes.

12. In a system for isotope enrichment, a method for separating a selectively ionized isotope in a plasma which includes ions of said selectively ionized isotope and corresponding electrons, said method including the steps of:

applying a magnetic field to said plasma in a preset direction;

periodically applying an electric field to said plasma between a first electrode and an at least partially surrounding second electrode with the direction of said electric field between said first and second electrodes being different from said preset direction for said magnetic field;

establishing said magnetic and electric fields to produce an interaction on said ions and electrons which accelerates said electrons on closed paths around said first electrode and which accelerates said ions to a path directed toward one of said first and second electrodes.

13. The method for separating an isotope of claim 12 further including the step of generating said plasma as a flow having a generally homogeneous local particle direction in the vicinity of said first and second electrodes with said generally homogeneous direction being substantially different from the direction of the path to which said ions are accelerated.

providing a radially expanding vapor having selective ionization of said particles to define said plasma environment; and 14. In a system for isotope enrichment wherein a plasma is generated comprising electrons and ions of said isotope in a substantially greater percentage than in the neutral state, a method for separating said ions in said plasma including the steps of:

applying a magnetic field to said plasma;

applying a pulsed electric field to said plasma between electrodes to accelerate said ions and said electrons in opposite directions;

said magnetic field operating to deflect the accelerated ions and electrons; and said electric field being established in a configuration to provide a high driving point impedance of said electric field in said plasma by impeding the flow of electrons between said electrodes and low skin effect of said plasma in response to said electric field for rapid penetration of said electric field with each pulse.

15. In a technique for isotope enrichment apparatus for separating ions of one isotope in a plasma environment having selective ionization of said one isotope and wherein said plasma environment is bounded, said apparatus including:

means for accelerating said ions and the electrons of said plasma environment in different directions;

means for deflecting the accelerated ions and electrons on curved paths having different curvatures representative of the different mass-to-charge ratios of said ions and electrons;

the deflected acceleration of said electrons being on paths generally closing within the bounded environment; and means for collecting said deflected, accelerated ions.

16. The apparatus of claim 15 wherein:

said accelerating means includes means for applying a pulsed electric field to said environment; and said deflecting means includes means for applying a magnetic field to said environment perpendicular to said electric field.

17. The apparatus of claim 15 wherein said accelerating means includes:

a first electrode;

a second electrode at least partially surrounding said first electrode; and means for applying an electric signal pulse between said first and second electrodes.

18. The apparatus of claim 17 wherein said electric signal pulse applying means includes means for providing a pulse duration sufficiently short to accelerate said ions without substantially accelerating charged particles resulting from a charge exchange reaction with said ions.

19. The apparatus of claim 15 further including means for replenishing electrons apart from electrons released by ionization.

20. The apparatus of claim 15 wherein said means for collecting said accelerated ions are placed to prevent substantial particle collisions in the path of said ions to said collecting means.

21. Apparatus for collecting particles of a first charge type in an environment containing said particles and at least particles of an opposite charge type differing in mass-to-charge ratio from said particles of said first charge type comprising:

a first electrode placed within said environment;

a second electrode placed a distance from said first electrode through said environment;

means for applying a magnetic field to said environment;

means for applying electric potential to said first and second electrodes to induce general circulation of the opposite charge type particles around said first electrode and for accelerating said particles of said first charge type in a direction distinct from said circulation to permit separate collection of said particles of said first charge type.

22. The apparatus of claim 21 wherein said potential applying means includes means for applying said potential in a pulse which provides acceleration of said particles of said first charge type in said distinct direction without substantial acceleration of charged particles resulting from charge exchange reactions with said particles of said first charge type.

23. The apparatus of claim 22 further including:
means for generating a radially expanding vapor of a material containing plural isotopes;
means for selectively ionizing an isotope of the expanding vapor to produce said particles of said first charge type and said opposite charge type particles and thereby defining said environment.

24. The apparatus of claim 23 wherein:
said vapor comprises uranium;
said selective ionizing means includes means operative to produce selective ionization of the $U_{235}$ isotope of uranium without corresponding ionization of the $U_{238}$ isotope;
said particles of said first charge type include the ions of said $U_{235}$ isotope.

25. In a technique for isotope enrichment, a system for separating a selectively ionized isotope in a plasma which includes ions of said selectively ionized isotope and corresponding electrons, said system comprising:
a first electrode in said plasma;
a second electrode at least partially surrounding said first electrode;
means for applying a magnetic field to said plasma in a preset direction in the region between said first and second electrodes;
means for applying an electric field between said first and second electrodes in a direction different from said preset direction; and
means for collecting ions directed thereto;
said electric and magnetic fields being established for accelerating said electrons into general circulation around said first electrode on generally closed paths and for accelerating said ions toward said collecting means.

26. The system for separating an ionized isotope of claim 25 further including:
means for generating a radially expanding vapor of a material which includes said ionized isotope;
said vapor expansion generating means including means for producing a generally homogeneous local particle direction in said vapor expansion over a wide angle;
a plurality of the first and second electrode arrangements placed around the wide angle of said vapor expansion to receive said vapor expansion in the region between said first and second electrodes.

* * * * *

UNITED STATES PATENT OFFICE
CERTIFICATE OF CORRECTION

PATENT NO. : 3,939,354
DATED : February 17, 1976
INVENTOR(S) : George Sargent Janes It is certified that error appears in the above—identified patent and that said Letters Patent are hereby corrected as shown below:

ABSTRACT, line 2, "empolying" should read --employing--.

Column 7, line 65, "providing a radially expanding vapor having selective" should be deleted.

Column 7, line 66, "ionization of said particles to define said plasma" should be deleted.

Column 7, line 67, "environment; and" should be deleted.

Signed and Sealed this fifteenth Day of June 1976

[SEAL]

Attest:

RUTH C. MASON
Attesting Officer

C. MARSHALL DANN
Commissioner of Patents and Trademarks